Nov. 17, 1925.

A. T. HESPE

THERMOMETER

Filed Jan. 10, 1922

1,561,925

Inventor
Alfred T. Hespe
By his Attorney

Patented Nov. 17, 1925.

1,561,925

UNITED STATES PATENT OFFICE.

ALFRED T. HESPE, OF NEW YORK, N. Y.

THERMOMETER.

Application filed January 10, 1922. Serial No. 528,327.

*To all whom it may concern:*

Be it known that I, ALFRED T. HESPE, a citizen of the United States, and resident of the city of New York, county of New York, State of New York, have invented new and useful Improvements in Thermometers, of which the following is a specification.

One of and probably the most trying operation or condition surrounding the use of thermometers is the rapid and accurate reading thereof or as it may be termed, the discovery of the location of the top of the mercury column.

After years of study and experimentation, thermometer manufacturers and users have concluded that the only expansible material or element that can be employed in thermometers with a satisfactory degree of efficiency is metallic mercury and that a thermometer tube must be made of particularly clear and brilliant glass.

The mercury employed must be very pure and clean and it is well known that pure mercury presents a surface of extreme brightness and when such mercury is arranged or caused to pass through a brilliant glass column, the reflection or the absorption of light rays by the surface of the mercury is so near that of glass that the position of the mercury in the glass tube can hardly be discovered. It will also be borne in mind that the diameter of the mercury column in relation to the size of the surrounding glass tube is so small that it must be in many instances magnified to be easily readable; and it must further be borne in mind that thermometer tubes are drawn, in manufacture, and that the drawing sets up longitudinal lines, minor reflective surfaces or longitudinal refractive stripes that are not in themselves mechanical or physical ribs, but are nevertheless optical ribs probably due to the high refractive index of the glass itself, the refraction being transverse to the longitudinal axis of the tube.

In the past thermometer manufacturers and users have thought to color the mercury employed, but have found this physically impossible. They have substituted spirits for the mercury and have discovered that spirit thermometers, while satisfactory for some purposes are not accurate and cannot be used for extremes and numerous other expedients have been promulgated for the purpose of making the reading of the thermometer easier, each to be abandoned after experiments have proven them unsatisfactory.

My suggestion and invention consists in emphasizing the position of the mercury column by causing the mercury to pass over a sharply contrasting surface which may or may not be backed up by a second contrasting surface, the combined result of which is to make the mercury column stand out in high relief. In the specification which follows I will describe the arrangement and operation which result in the accomplishment of the purpose and the accompanying drawing should be referred to for a complete understanding of the specification.

The drawings are exaggerated in size and detail to emphasize my means and invention.

Figs. 3, 4, 5, and 6 are end views of prismatic tubes.

Figure 7:
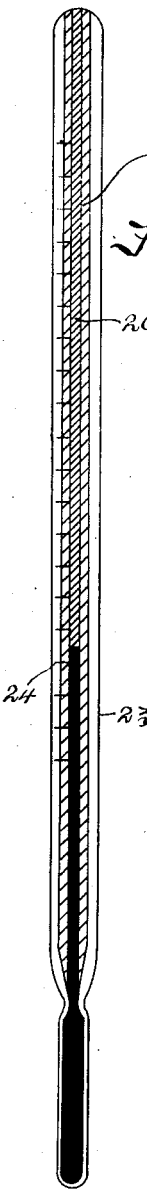

Fig. 7 shows in elevation a thermometer of different construction.

Figure 6:
Figure 8:
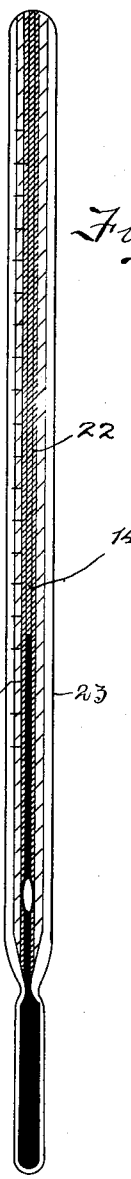

Fig. 8 shows in elevation a self-registering thermometer, the end view of which is shown in Fig. 6, the cross hatching on all of these figures being intended to indicate color and not section.

Figure 9:
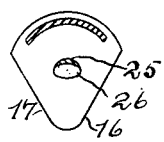

Fig. 9 shows in end view a common construction for small bore thermometers.

Similar reference numerals indicate like parts in all the figures where they appear.

Figure 1:
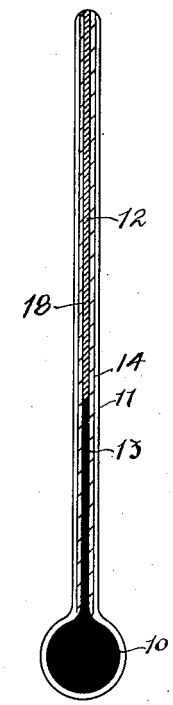
Fig. 1 shows in elevation a thermometer tube.

In Fig. 1, at 10, I show a bulb of a thermometer and formed integral therewith or secured thereto is a glass tube 11, having a central perforation 12, through which the mercury 13 is free to pass.

Figure 2:
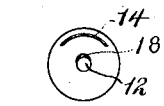
Fig. 2 is an end view of a round tube.
Figure 3:
Figure 4:
Figure 5:
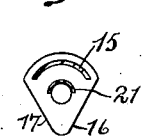

An enlarged view of this thermometer is shown in Fig. 2, slight modifications of which are shown in Figs. 3 and 4. The broad cross-hatching is intended to indicate a longitudinal insert of colored glass which is usually and preferably white, arranged as shown at 14 and intended to provide an opaque or light proof backing for the mercury column. It is not usual to make this backing strip entirely opaque, but nearly so, so that the light rays passing through this portion will be limited.

The use of a backing member of various colors as shown at 14 is quite common in the art of thermometer making. This member is a longitudinal strip of colored glass, molded and drawn into the wall of the thermometer tube at a desired point, which is usually adjacent to the periphery of a round tube as shown at 14, or adjacent to the rounded portion of the prism shaped tube as shown in Figs. 3 to 6 inclusive. The width of this strip, which in the prismatic forms is indicated at 15 may vary and may extend to the flat sides 16 and 17 of the prism as shown in Fig. 6. I have previously said that the object of my invention is to make the end of the mercury column more readily discernible and to make its exact position more readily discoverable and to thereby make the thermometer more readily and more accurately readable.

To accomplish this, I place adjacent to the perforation 12 in which the mercury rises and falls or at any point between the perforation 12 and the light shield 14, a strip of colored glass or other suitable material shown at 18, 19, 20, 21 and 22 in the several figures.

At 18 in Fig. 1, this additional colored member is narrow, is in fact of a width not quite equal to the diameter of the bore of perforation 12. Its color may be selected, but should obviously be a color sharply contrasting with the color of the mercury and that of the light shield 14 and also of a color different from that evidenced in the glass by reflected or refracted rays.

If we assume that ordinary clear glass is used in the manufacture of the thermometer, under most lights the glass will appear to have a slightly greenish or silver tint; under day light the mercury usually has a brilliant silver color, ordinarily the member 14 which I am pleased to call a light shield will be white; to obtain highest efficiency then with this combination, I would make the strip 18, red, pink or orange color.

As shown in Fig. 1, the mercury rising in the perforation 12 obliterates the color member 18 by covering it and from the observation or lens side of the thermometer tube it will appear that an additional means is provided for determining the accurate reading of the thermometer. The operator may read the top edge of the mercury column or the bottom edge of my colored strip 18 and while I realize that these two points are the same and that the apparent bottom edge of the strip 18 is produced by the movement of the mercury over the strip, I also know that it is much easier to discover the compound indicating line formed at the junction point between two substances of different color, than it is to discover the top of any member or thing extending into the atmosphere and particularly if a thing or substance be light of color or be colored white, gray or any other light color as previously set forth and it is common knowledge that the top edge of the thin mercury column in a thin glass tube is exceedingly difficult to discover.

My experiments have further shown me that my improvement makes possible the accurate use of a thermometer to persons of poor eye sight or persons to a more or less degree color blind and it is of course well within the province of my device to make the colors of the members 14 and 18 so contrasting and of such colors as to make the use of this thermometer possible with persons color blind to a marked degree or to persons having very poor eye sight.

In Fig. 7, I also show the color member 20 adapted and arranged to be entirely covered by the mercury as is rises in the tube, but I have found that certain operators under certain conditions prefer to be assured at all times of the position of the end of the mercury column. Such operators usually follow the mercury column upward to be assured that breaks in the column will not result in an improper reading of the thermometer. For such operators and for others who desire a contrasting mercury column, I will, as shown in Fig. 6, place my additional colored strip at a point between the light shield 14 and the mercury column 13. The strip would then be wider than the diameter of the perforation 12 and would, as shown in Fig. 8, be evident at each side of the mercury column, regardless of the position of the mercury in the tube and although I have shown this construction as applied to the self-registering thermometer 23, I do not desire it understood that it is my intention or preference that this construction be used only with this type of thermometer, as parts of one device shown, may be used with or in another.

In Fig. 9, I show a thermometer, wherein the bore is of oval shape. This shape of bore is known in the construction of thermometers, but I call particular attention to the fact that the contrasting member 25 shown adjacent to the oval bore 26 is so formed that the contrasting member becomes a wall of the bore and I consider this important as in my experiments I have found that extreme efficiency results from this construction as the contrastingly colored member immediately adjacent to the mercury, prevents stray lights between the mercury and the colored member and sharpens the line or edge of the mercury column.

The scales 24 on the thermometers in Figs. 7 and 8 are intended merely to carry out general lines of construction and for no other purpose. The color strip 21, shown in Fig. 5 will in effect be quite similar to the strip 22 in Fig. 6. The strip 22 or any of the colored strips may be arranged adjacent to the light shield 14 or at any place between the shield and the perforation, and certain advantages of my invention may be obtained by arranging my colored strips 18 to 22 inclusive in any of the positions shown, at the same time omitting the light shield 14 or 15. The general details of the construction of thermometer tubes according to my invention as herein set forth will be found by referring to my co-pending application filed Dec. 29, 1923, Serial #683,406.

Having carefully and fully described my invention, what I claim and desire to obtain is:—

1. A thermometer comprising a glass tube having a longitudinally arranged drawn glass colored member forming a portion of the wall of the bore at the back side only thereof and adapted to be covered by the fluid rising in the bore, when viewed through the front.

2. A thermometer comprising a lens front glass tube, a colored glass member forming one wall of the bore thereof and so arranged that the fluid in rising will obliterate the colored member from view through the lens front of said tube.

Signed at the city, county and State of New York, this 23rd day of December, 1921.

ALFRED T. HESPE.